(12) United States Patent
Anaya Luengo

(10) Patent No.: US 6,226,284 B1
(45) Date of Patent: May 1, 2001

(54) SPS SYNCHRONIZATION METHOD

(75) Inventor: Juan José Anaya Luengo, Madrid (ES)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/107,987

(22) Filed: Jun. 30, 1998

(30) Foreign Application Priority Data

Jul. 1, 1997 (ES) .................................................. 9701456

(51) Int. Cl.$^7$ ...................................................... H04J 3/06
(52) U.S. Cl. .......................... 370/350; 370/304; 370/503
(58) Field of Search ................................ 370/316, 503, 370/509, 510, 514, 516, 350, 304; 375/354, 362, 363, 364, 365, 371; 455/13.2

(56) References Cited

U.S. PATENT DOCUMENTS

| | | | |
|---|---|---|---|
| 5,600,329 | * 2/1997 | Brenner | 342/357.03 |
| 6,055,021 | * 4/2000 | Twitchell | 348/513 |
| 6,111,541 | * 8/2000 | Karmel | 342/357.13 |
| 6,144,336 | * 11/2000 | Preston et al. | 342/357.09 |

* cited by examiner

*Primary Examiner*—Wellington Chin
*Assistant Examiner*—Brenda H. Pham
(74) *Attorney, Agent, or Firm*—Sughrue, Mion, Zinn, Macpeak & Seas, PLLC

(57) ABSTRACT

This invention refers to a synchronization method of a remote unit from a SPS timing signal (SPS) produced in a local unit. The SPS timing signal (SPS) is in the form of successive pulses (1) which are produced from signals received from satellites. The SPS signal (SPS) is asynchronous with respect to the system clock, that is, the reference clock defined between the local unit and the remote unit has no initial relationship with the SPS signal (SPS).

The invention is characterized in that it includes the following steps:

- calculation in the local unit of an information ("10011010") representing the number of local clock cycles occurring from the appearance of a pulse (1) until the moment (SL) when this information is injected into the data stream (FR); and
- generation in the remote unit of a synchronization signal related to the SPS signal, depending on this information ("10011010").

3 Claims, 2 Drawing Sheets

SPS SYNCHRONIZATION METHOD

OBJECT OF THE INVENTION

This invention refers to a method for the remote, or distant, synchronization of a remote unit making use of a temporary reference defined by a SPS (Satellite Positioning System) system.

STATE OF THE ART

SPS devices according to the state of the art, for example those described in the U.S. Pat. No. 5,501,797 patent being included in this application through reference, receive signals transmitted by satellites and thereby determine a SPS clock pattern, for example a pattern of one pulse per second. To synchronize an unit which is at a distance from the SPS device, the European Telecommunications Standard ETS 300 175-2, pages 38–44, published by the E.T.S.I. (European Telecommunications Standards Institute) on September 1996, describes a solution in which the clock pattern is transmitted to the remote unit via its own link, other than that employed for data transmission.

This solution, according to the state of the art, is difficult to implement in already existing systems in which there is only one data transmission link between the local and remote units.

CHARACTERIZATION OF THE INVENTION

An object of the invention is to define a synchronization method of a remote unit based on a SPS timing signal produced in a local unit, the two units being connected via a data link, synchronous or asynchronous with the SPS signal. In this data transmission link there is a free channel for the transmission of data relating to the SPS signal.

As a consequence, a synchronization method of a remote unit from a SPS timing signal produced in a local unit, this SPS timing signal having the form of successive pulses produced from signals received from satellites, is characterized in that it includes the following steps:

- calculation in the local unit of an information representing the number of local clock cycles occurring from the appearance of a pulse until the moment when this information is injected into the data stream;
- injection of said information into said data stream; and
- generation in the remote unit of a synchronization signal related to the SPS signal, depending on this information.

To take into account the transmission delay time that occurs between the local and remote units, the method is characterized in that the synchronization stage depends also on a data transmission time between said local and remote units.

Additionally, the method includes a correction stage of the SPS signal generation in the remote unit which is a function of the frequency shift of the local clock with respect to the SPS timing signal in the local unit.

BRIEF FOOTNOTES TO THE FIGURES

A fuller explanation of this invention is given in the description below based on the figures attached in which.

DESCRIPTION OF THE INVENTION

According to a preferred implementation, the invention can be applied to the synchronization of a number of base station controllers from a radio access node in a radiocommunications system with mobile terminals, though the invention can be implemented in all types of environment in which there is a requirement to distribute SPS synchronization from a local unit to at least one remote unit.

Figure 1:
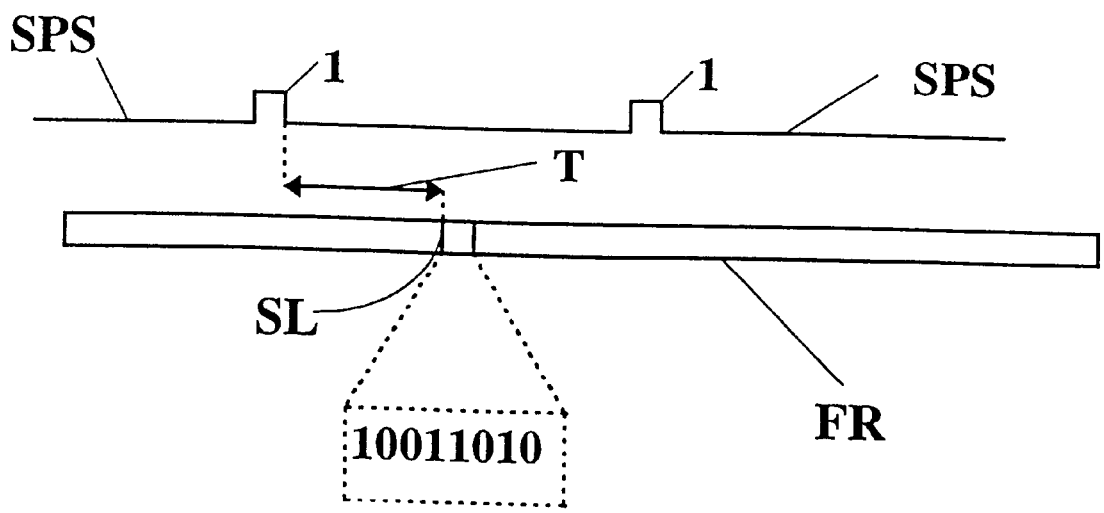
FIG. 1 shows a timing diagram to explain the generic idea of this invention.

With reference to FIG. 1, the upper line shows a timing signal SPS as it is generated by a SPS device in a local unit. For example, this timing signal SPS consists of consecutive pulses 1 separated from each other by intervals of one second. A lower line shows a data stream signal FR asynchronous with the signal SPS such as it is transmitted periodically from the local unit to the remote unit that has to be synchronized with the timing signal SPS. In this data stream FR, it is proposed, according to the invention, to inject an information representing the number of local clock cycles occurring from the appearance of a pulse 1 until the moment SL when this information is injected into the data stream. For example, the data stream FR consists of successive frames in TDM (Time Division Multiplexing) format and the injection moment SL is the start of a time slot free of other useful data transmitted between the local unit and the remote unit.

Figure 2:
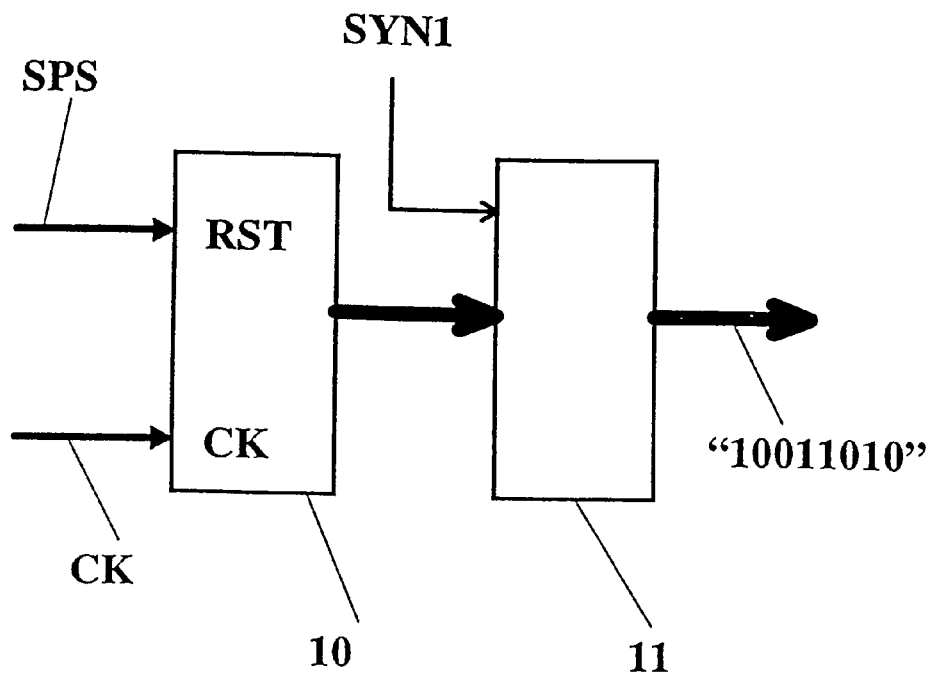
FIG. 2 shows a block diagram of a transmission circuit for the implementation of the invention.

With reference to FIG. 2, the circuit employed in the local unit comprises a counter 10 and a storage register 11. The counter 10 receives at a first initialization input RST the timing signal SPS produced locally and at a second incrementing input CK a local system timing signal CK which has, for example, a frequency of 4.864 MHz. The CK signal increments the counter 10 periodically from an initialization time defined by a pulse 1 of the signal SPS. The content of the counter 10, that determines an information representing the number of local clock CK cycles from the last appearance of a SPS pulse, is loaded into the storage register 11 when a synchronization pulse SYN1 appears, this latter defining the moment SL for injecting the content of the counter 10 into the data stream FR transmitted to the remote unit. The content of the register 11 is what is sent in the data stream FR. Thus the information calculated by the counter 10, which represents the number of local clock cycles from the appearance of pulse 1 until the moment SL when this information is injected into the data stream FR, is injected into this data stream FR. As it is shown in FIG. 1, this information is in the form of successive bits "10011010".

Figure 3:
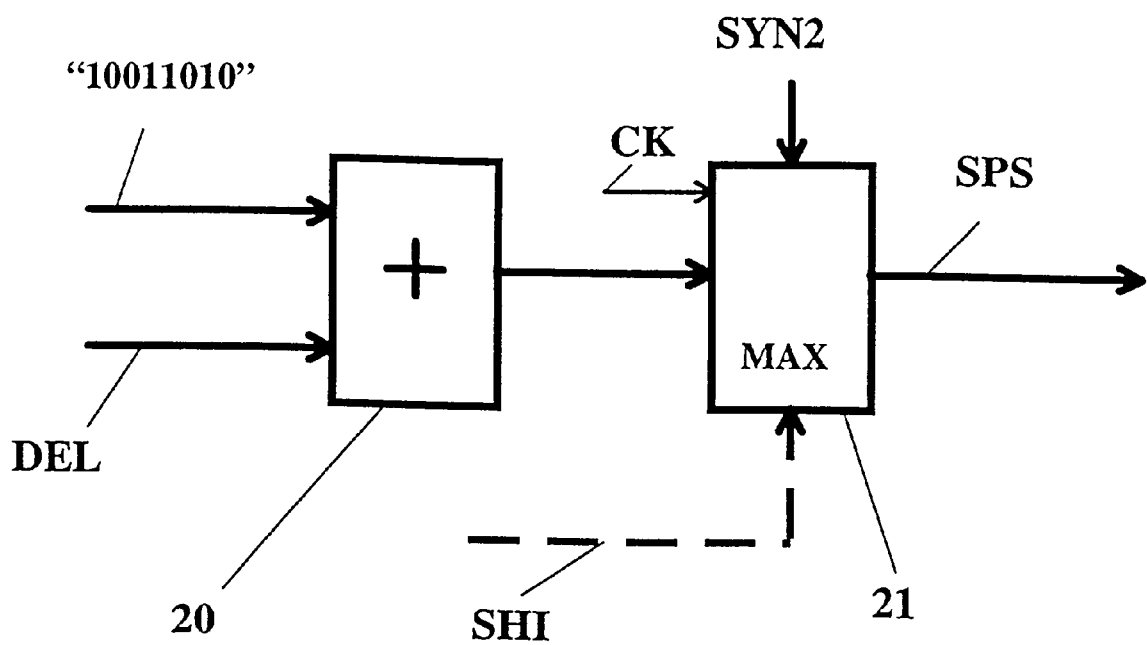
FIG. 3 shows a block diagram of a reception circuit for the implementation of the invention.

With reference to FIG. 3, the circuit used in the remote unit comprises an adder 20 and a programmable counter 21. The adder 20 adds the information "10011010" received from the local unit to a separately calculated information DEL. The information DEL represents the delay time for the transmission between the local and remote units. This information is calculated, for example, in the following manner. The local unit sends a particular pattern inside the data stream FR. When the remote unit receives this particular pattern, it immediately sends back an answering pattern. The local unit can therefore measure the round-trip delay time between itself and the remote unit. Dividing this time by two gives the delay time DEL between the local unit and the remote unit. This information is sent to the remote unit where the transmission time is added to the information "10011010". This measuring procedure for the delay time between two units is employed, for example, in GSM (standards defined by E.T.S.I.) between a base station and a mobile terminal. Thus, advantageously, in the remote unit, the SPS synchronization depends also on the transmission time between the remote unit and the local unit. The information produced at the output of the adder 20 represents the total time that has elapsed from the appearance of a SPS pulse 1 in the local unit. The counter 21 is incremented by the clock CK of the remote unit which is the same as the clock CK (FIG. 2) of the local unit and the initialization value of the counter 21 is set by the output from the adder 20.

The counter 21 has a register with a maximum value MAX equal to the number of cycles of clock CK between two SPS pulses 1. The two units are synchronized, that is, both have frame synchronization. Thus the remote unit is capable of producing a synchronization signal SYN2 precisely when it receives the part of the frame that includes the information "10011010" representing the number of cycles of the local clock CK since the last appearance of a SPS pulse 1. When this synchronization signal SYN2 occurs, the information produced at the output of the adder 20 is loaded into the counter 21 as the initial value of counter 21. In addition, the counter 21 is incremented by the clock signal CK. When the content of the counter 21 reaches the maximum value MAX, a SPS pulse is generated at its output, which reproduces with perfect synchronization the pulse 1 produced by the local unit. In other implementations, this SPS signal generated in the remote unit can be different in form to the SPS signal waveform generated in the local unit, for example it could have a higher or lower frequency, but in all cases the two signals are inter-related by being in synchronism.

Because of the relative variation in frequency of the clock CK with respect to the signal SPS, the invention employs a SPS signal generation correction stage in the remote unit, as a function of the shift in the clock CK with respect to the SPS signal, both produced in the local unit. For this reason, in the local unit, the number SHI of cycles of the local clock CK between two successive SPS pulses 1 is measured and transmitted to the remote unit via the data stream FR. This number SHI of cycles of the local clock CK between two successive SPS pulses 1 determines the maximum value MAX that the remote unit counter 21 can reach. This correction stage in the generation of the SPS signal in the remote unit as a function of the shift of the clock CK with respect to the SPS signal produced in the local unit can be applied periodically in order to take into account the relative variation in frequency between the timing signal SPS and the local clock CK signal in the local unit.

What is claimed is:

1. Synchronization method of a remote unit from a SPS timing signal produced in a local unit, this SPS timing signal being in the form of successive pulses (1) which are produced from signals received from satellites, the method being characterized in that it includes the following steps:

calculation in the local unit of an information ("10011010") representing the number of local clock cycles occurring from the appearance of a pulse until the moment when this information is injected into the data stream (FR);

injection of said information ("10011010") into said data stream (FR); and generation in the remote unit of a synchronization signal related to the SPS signal, depending on said information ("10011010").

2. Method according to claim 1, characterized in that this synchronization stage depends also on the transmission time (DEL) between said local and remote units.

3. Method according to claim 1, characterized in that it includes a correction stage for the SPS signal generation in the remote unit as a function of the frequency shift of the local clock (CK) with respect to the SPS timing signal in the local unit.

* * * * *